United States Patent [19]

Beauviala et al.

[11] 4,264,165

[45] Apr. 28, 1981

[54] FILM EXPOSING EQUIPMENT UTILIZING A SUCCESSION OF DIODES FOR A LUMINOUS DISPLAY DEVICE

[75] Inventors: Jean-Pierre Beauviala, Grenoble; Jean-Pierre Charras, Brignoud, both of France

[73] Assignee: Societe AATON, Grenoble, France

[21] Appl. No.: 969,667

[22] Filed: Dec. 15, 1978

[30] Foreign Application Priority Data

Dec. 27, 1977 [FR] France ............................. 77 39319

[51] Int. Cl.$^3$ ....................... G03B 17/20; G03B 17/24
[52] U.S. Cl. ........................................ 354/55; 354/56; 354/60 L; 354/106
[58] Field of Search ................ 354/60 L, 53, 289, 58, 354/105–109, 54–57; 340/753, 754; 352/90, 170, 171

[56] References Cited

U.S. PATENT DOCUMENTS

| | | | |
|---|---|---|---|
| 4,092,653 | 5/1978 | Kawasaki et al. | 354/60 L |
| 4,112,440 | 9/1978 | Kanemaru | 354/53 X |
| 4,140,378 | 2/1979 | Suzuki et al. | 354/53 |
| 4,149,795 | 4/1979 | Sakurada et al. | 354/53 X |

Primary Examiner—L. T. Hix
Assistant Examiner—W. J. Brady
Attorney, Agent, or Firm—Oblon, Fisher, Spivak, McClelland & Maier

[57] ABSTRACT

A film exposing equipment such as motion picture cameras and still cameras is equipped with photometric devices measuring the quantity of light falling upon the film to be exposed. The display device showing the user the measurement result comprises a succession of light emitting diodes adjacent to each other, determining the measuring scale, these diodes being powered and hence lit up at all times with the exception of the single diode among them, which, unlit, constitutes the mark giving the measurement result. The succession of light emitting diodes comprises at predetermined intervals, specific diodes different from the other diodes by their dimensions and/or colors, constituting specific marks on the measurement scale.

10 Claims, 5 Drawing Figures

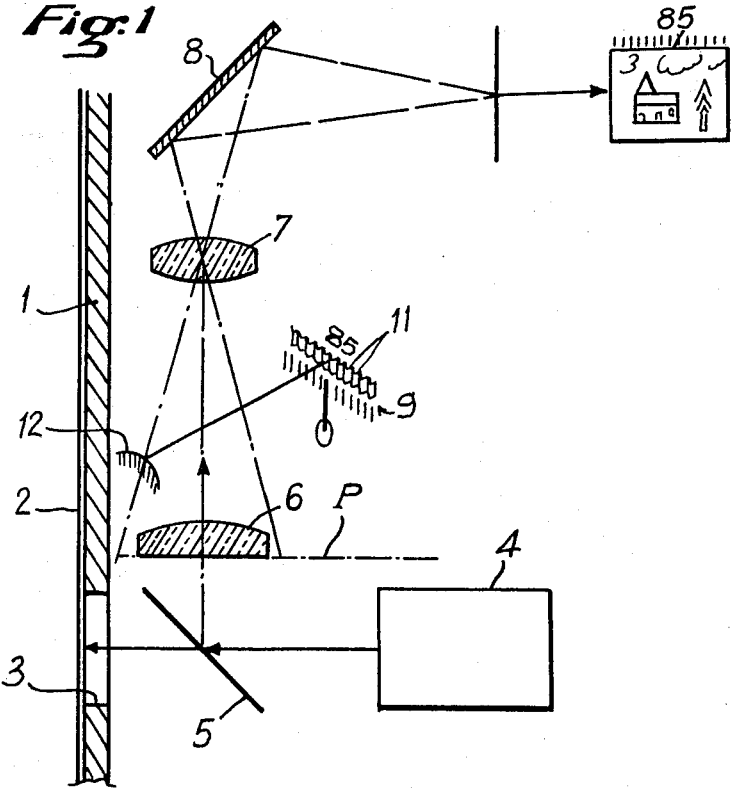
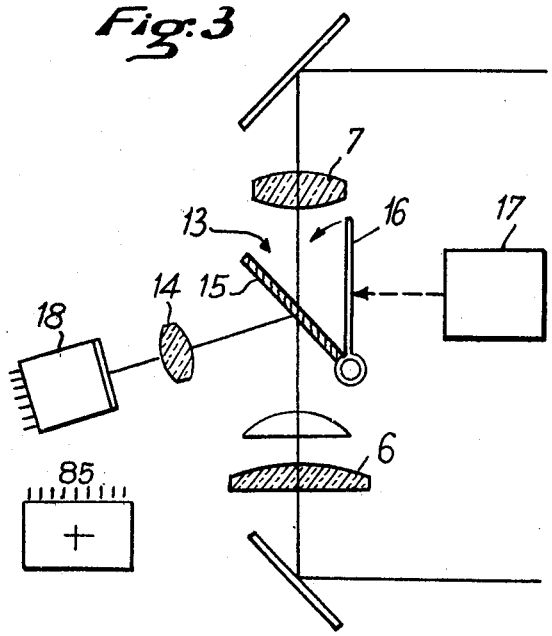
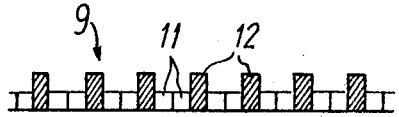

FILM EXPOSING EQUIPMENT UTILIZING A SUCCESSION OF DIODES FOR A LUMINOUS DISPLAY DEVICE

BACKGROUND OF THE INVENTION

The present invention concerns improvements brought to film exposing equipment such as motion picture cameras and still cameras.

It is known that film exposing equipment such as motion picture cameras and still cameras is equipped with photometric devices measuring the quantity of light falling upon the film to be exposed. Display devices showing the user the measurement result generally comprise a galvanometer whose moving needle indicates this measurement result, or light emitting diodes which light up to show this result.

The disadvantage of known display devices is that in low light conditions, or in the dark, the reading is very difficult; and in the case of the galvanometer, the measuring device is particularly fragile. Moreover, the diodes as they light up distract the camera operator.

SUMMARY OF THE INVENTION

The object of the present invention is essentially to remedy these disadvantages with an extremely simply constructed display device, easily installed in all film exposing equipment.

For this film exposing equipment such as motion picture cameras or still cameras, equipped with a display device with a spot moving in relationship to a scale and showing variations of a measured parameter, is characterized by the fact that the display device contains a succession of light emitting diodes adjacent to each other, determining the measuring scale, these diodes being powered and hence lit up at all times with the exception of the single diode among them, which, unlit, constitutes the mark giving the measurement result.

Through a complementary characteristic of the present invention, the succession of light emitting diodes comprises at predetermined intervals, regular or not, specific diodes different from the other diodes by their dimensions and/or colours, constituting specific fixed marks on the measurement scale.

The display device in the film exposing equipment of this invention has the advantage of being particularly sturdy and inexpensive, as it can be constructed from light emitting diodes readily available on the market. The moving mark indicating the result of the measurement is thus constituted by a darkened mark, that is the unlit diode moving over the luminous line, as a needle would on a galvanometer.

Through a complementary characteristic of the invention, the film exposing equipment is equipped with a means which, function of the film sensitivity set, allows the luminosity of light emitting diodes in the display device to be varied; similarly variations can be made of the luminosity of the light emitting diodes of a device marking figures on the film, or of the amplifier gain in the photometric measuring device contained in the equipment.

BRIEF DESCRIPTION OF THE DRAWINGS

Hereafter will be described, as non limitative examples, various forms of execution of the present invention in reference to the annexed drawing in which:

FIG. 1 is a partial schematic vertical section of a motion picture camera of the present invention equipped with a luminous display device.

FIG. 2 is the diagram of a succession of diodes of the display device.

FIG. 3 is the diagram of variant execution.

DESCRIPTION OF THE PREFERRED EMBODIMENT

Figure 4:
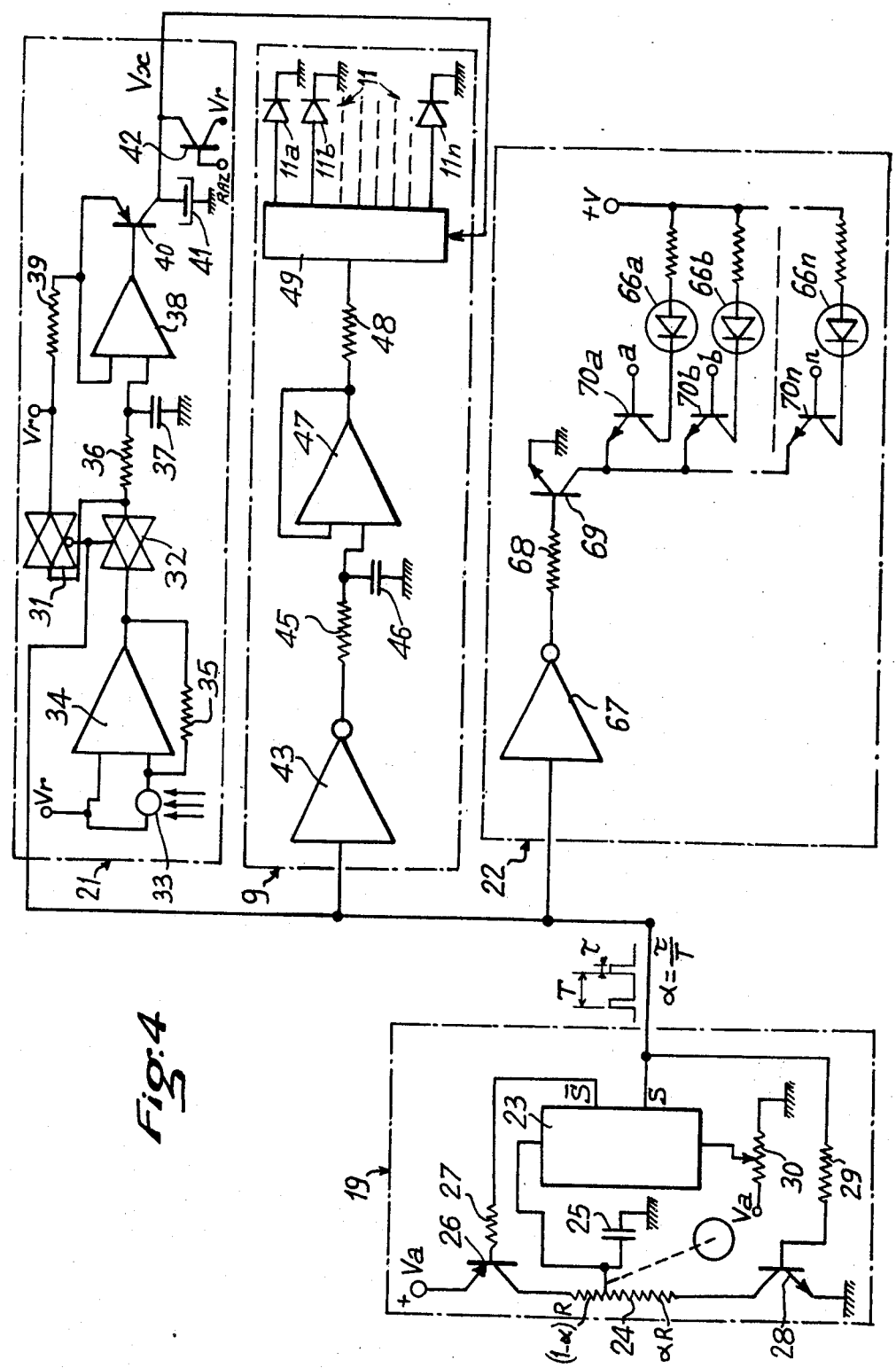
FIG. 4 is the schematic diagram of the electrical circuit controlling various photometric measurement, display, and marking devices, function of film sensitivity.

In FIG. 1 is a partial and schematic representation of a moving picture camera containing an aperture plate (1) down which cinematographic film (2) runs, and which contains an opening, aperture gate (3) placed opposite a lens (4). The luminous flow from this lens is periodically intercepted by a moving shutter (5) which also constitutes, in the case of a reflex type camera, a mirror sending the light flow towards a viewing screen (6), and from there, through the intermediary of an optical viewing system (7) and a mirror (8), to the camera viewfinder.

The camera is also equipped with a photometric measuring device measuring the light flow falling on the film as it is exposed through the aperture gate (3); this device is not represented in FIG. 1. The result of the photometric measurement carried out is displayed in such a way as to allow the operator to read this result in the camera viewfinder.

According to the invention, the luminous display device (9) indicating the result of the photometric measurement comprises a succession of light emitting diodes (11) adjacent to each other and determining the measurement scale. A particular form of execution of the display device (9) is illustrated in FIG. 2. These diodes are powered and hence luminous continuously with the exception of one among them, unlit at a given instant, constituting the mark indicating the measurement result.

Preferably, the succession of light emitting diodes comprises at predetermined intervals, regular or not, specific diodes (12) differing from the other diodes by their dimensions and/or colours, constituting specific fixed marks on the measurement scale.

Thus the operator can at all times have in the viewfinder a luminous scale along which a darkened spot moves indicating the result of the photometric measurement.

Naturally, the display device may also include, if so desired, a display in numbers and a galvanometer needle as schematically represented in FIG. 1. The luminous display device (9), constituted by the succession of light emitting diodes side by side, can very easily be constructed with commercially available diodes coated in a plastic diffusing material. By the presence of this diffusing material, an effect of continuity is ensured all along the luminous scale. However, such a succession of diodes takes up too much space to be installed as in the viewfinder.

Therefore, through another characteristic of the invention, an auxiliary optical system is used to form a reduced image of the display device (9). This device is composed essentially of a convex mirror (12) placed between the viewing screen (6) and the optical viewing system (7) to form in the real image plane (P) of the viewing screen a reduced image of the succession of diodes (11) constituting the display device (9). In this case, the first lens of the optical viewing system (7) sees the light emitting diodes (11) constituting the display device (9), these diodes appearing as sharp as the image formed in the plane P.

As can be shown in FIG. 1 the diodes (11) constituting the luminous display device (9) are situated outside the path of light flow towards the camera viewfinder, so as not to hinder the passage of this flow. A virtual image of the succession of diodes is obtained on the same plane P as that of the viewfinder (6); moreover the light emitting diodes (11) appear much smaller than they are in reality.

FIG. 3 illustrates a complementary characteristic of the invention which consists of incorporating into the camera, between the viewing screen (6) and the optical viewing system (7) a beam splitter (13) making it possible to bleed off a part of the light rays going towards the operator's eye, and to send them towards another lens (14) producing an image going towards a photosensitive device (vidicon tube, solid state target, etc . . . )

In fact, as can be seen from FIG. 3, the beam splitter (13) comprises, in the light path, a fixed semi-reflecting transparent pellicle (15), allowing the passage of the light rays towards the optical viewing system (7), while reflecting a part of these rays towards the lens (14). The beam splitter (13) also contains a pivoting pellicle (16) forming a mirror; this pellicle can be placed flush against the semi-transparent pellicle (15), driven by a motor (17) or with manual control. When the photosensitive device (18) is to be used, the pivoting mirror (16) is placed up against the semi-transparent pellicle (15) so that the entire light flow is reflected towards the photosensitive device. However, when the photosensitive device (18) is not in use, the mirror (16) is pivoted away into the position shown in FIG. 2.

In FIG. 3, below photosensitive device (18), the image which appears on the device is indicated, showing in its upper portion the image of the luminous display device (9) with its adjacent light emitting diodes.

Now will be described, with reference to FIG. 4, a non limitative form of execution of a circuit incorporated into the motion picture camera in order to control simultaneously, function of the film sensitivity, the amplifier gain setting of the photometer measuring the quantity of light falling on the film, the luminosity of the light emitting diode display device, and possibly the luminosity of the light emitting diodes of a marking device incorporated in the camera to inscribe figures on the film. More particularly, the more sensitive the film, the higher the amplifier gain of the light flow measuring system must be, and conversely the lower the power supply to the light emitting diodes of the display device and marking device must be.

As the light flow measuring system, the display device, and the marking device are not in the same area in the camera, a unique remote control system according to the present invention is used; a potentiometer or a switch, for example, can be used to get the sensitivity of the film used, and the system emits a periodic signal, the cyclic ratio of which can be varied in function of the film sensitivity.

In FIG. 4 can be seen the control device 19 delivering a periodic rectangular signal, of period T, and duration $\tau$, that is a cyclic ratio $\alpha = \tau/T$ The output of the emitting device (19) is connected to device 21 constituting the system measuring the light flow falling upon the cinematographic film, to display device 9, and possibly to a device 22 ensuring the marking of figures on the film.

The advantage of device 19 for modulation control of the cyclic ratio is that this device can be used directly without decoding by each one of circuits 21, 9 and 22. In these three circuits, the cyclic variable ratio signal chops the current generators, allowing in the case of light emitting diodes with linear characteristics to modulate brilliance.

The control device (19) producing a variable cyclic ratio signal in function of the film sensitivity, comprises essentially a Schmitt trigger delivering a variable $\tau/T$ cyclic ratio signal on its output S. The control device (19) also has a potentiometer (24) whose slide contact can be adjusted in function of the film sensitivity setting. This slide contact is connected both to a capacitor (25) linked to the ground, and to the Schmitt trigger (23) input. One extremity of the potentiometer (24) is linked to the collector of a transistor (26) whose emitter is linked to the supply current +Va and whose base is linked, by a resistor (27) to the other output $\overline{S}$ of the Schmitt trigger (23). The other extremity of the potentiometer (24) is linked to the collector of a transistor (28) whose emitter is grounded, and whose base is linked by a resistor (29) to the output S of the trigger (23).

The trigger swings between an upper and lower threshold, chosen for example equal to 2 Va/3 and Va/3. If R is the total resistance value of potentiometer 24 and if $\alpha$ is the selected cyclic ratio value, in other words the film sensitivity set ($\alpha = \tau/T$), the potentiometer sliding contact (24) separates two parts of said potentiometer whose resistances are respectively values $\alpha R$ and $(1-\alpha) R$. The duration $\tau$ of the rectangular signal emitted is defined by $\tau = k\alpha R$, and this duration is equal to the discharge time of capacitor 25 from voltage 2 Va/3 to voltage Va/3.

What remains of the signal period is defined by: $T - \tau = k (1 - \alpha R)$ and this duration is equal to the charge time of capacitor 25 from voltage Va/3 to voltage 2 Va/3.

Coefficient K is the same in both aforementioned equations if the upper and lower thresholds are symmetrical in relation to the power half-voltage Va/2.

The control device (19) has the advantage of constituting a variable cyclic ratio signal generator, whose 0 ratio and 100 ratio correspond to the two extreme positions of the potentiometer sliding contact (24). The cyclic ratio signal $\alpha$, variable in function of the film sensitivity, is applied to the photometric measuring device (21) and more particularly to gates 31 and 32 constituting a chopper.

The measuring device (21) also contains a photoelectric cell (33) measuring the light received by the film, and connected to an amplifier input (34); this input is also linked to this amplifier's output by a resistor (35). The other input of amplifier 34 is linked, as is cell 33, to a voltage source, reference $V_r$. Amplifier output 34 is linked to gate 32, which is also connected to an integrating circuit having a series resistor (36) and a capacitor (37) linked to the ground. The common point of resistor 36 and capacitor 37 is connected to an input of amplifier 38 whose other input is linked through resistor 39 to the reference voltage source $V_{r'}$ to which is also connected the other gate, (31). The output of amplifier (38) is connected to the base of a transistor (40) whose emitter is linked to resistor 39, and the collector is linked both to an integrating capacitor 41 linked to the ground, and to the output of the measuring device (21) where voltage $V_x$ appears, corresponding to the quantity of light received. To this output is also linked the collector of a transistor (42) whose emitter is linked to the reference voltage source $V_r$ and whose base receives a zero start signal (RAZ) at each shutter revolution. Thus, in measuring device 21 the output voltage of the measuring amplifier (34), variable from O to $V_{max}$, is chopped by the signal emitted from the control device (19), the rhythm being that of the cyclic ratio $\alpha = \tau/T$, at both gates 31 and 32. The integrating circuit (36) (37) hence delivers at the input of amplifier 38 a voltage proportional both to the amplifier's (34) output voltage, and to the cyclic ratio $\alpha$. Through transistor 40, this amplifier ensures the charge of capacitor 41 at a voltage valve $V_x$, proportional to the light flow measured and to the integration time; thus the opening time of the shutter is automatically taken into account. Therefore, whatever the camera speed, the quantity of light received by the film is effectively measured at each shutter revolution. In other words, the device automatically takes the camera speed into account without any additional settings. The voltage $V_x$ present on capacitor 41, and proportional to both the light flow measured and the cyclic ratio $\alpha$, is applied to the display device 9 as a drive signal controlling the luminosity level of the light emitting diodes (11).

Another advantage provided by measuring device 21 is that even if the camera speed is changed continually ... the operator knows at all times just what lens opening he should be at, because the light flow measurement corresponds to the actual quantity of light received by the film at each revolution.

As shown in the aforementioned paragraphs, the output signal of the variable cyclic ratio control device (19) is applied to the display device (9) in order to vary the power supply current to the light emitting diodes (11), and more particularly to reduce the intensity of this current when the cyclic ratio, that is the film sensitivity, is higher. The display device (9) has an inverter amplifier (43) whose input receives the periodic signal of the $\alpha$ cyclic ratio, and whose output is connected to an integrating circuit with a resistor (45) and a grounded capacitor (46). The common point between resistor 45 and capacitor 46 is connected to an input of amplifier 47 whose output is linked by a resistor (48) to circuit 49 controlling the power supply to the light emitting diodes (11) and receiving on one of its inputs signal $V_x$ representing the quantity of light desired. Circuit 49 therefore receives a power supply current whose intensity is inversely proportional to cyclic ratio $\alpha$, in other words to the film's sensitivity.

Figure 5:
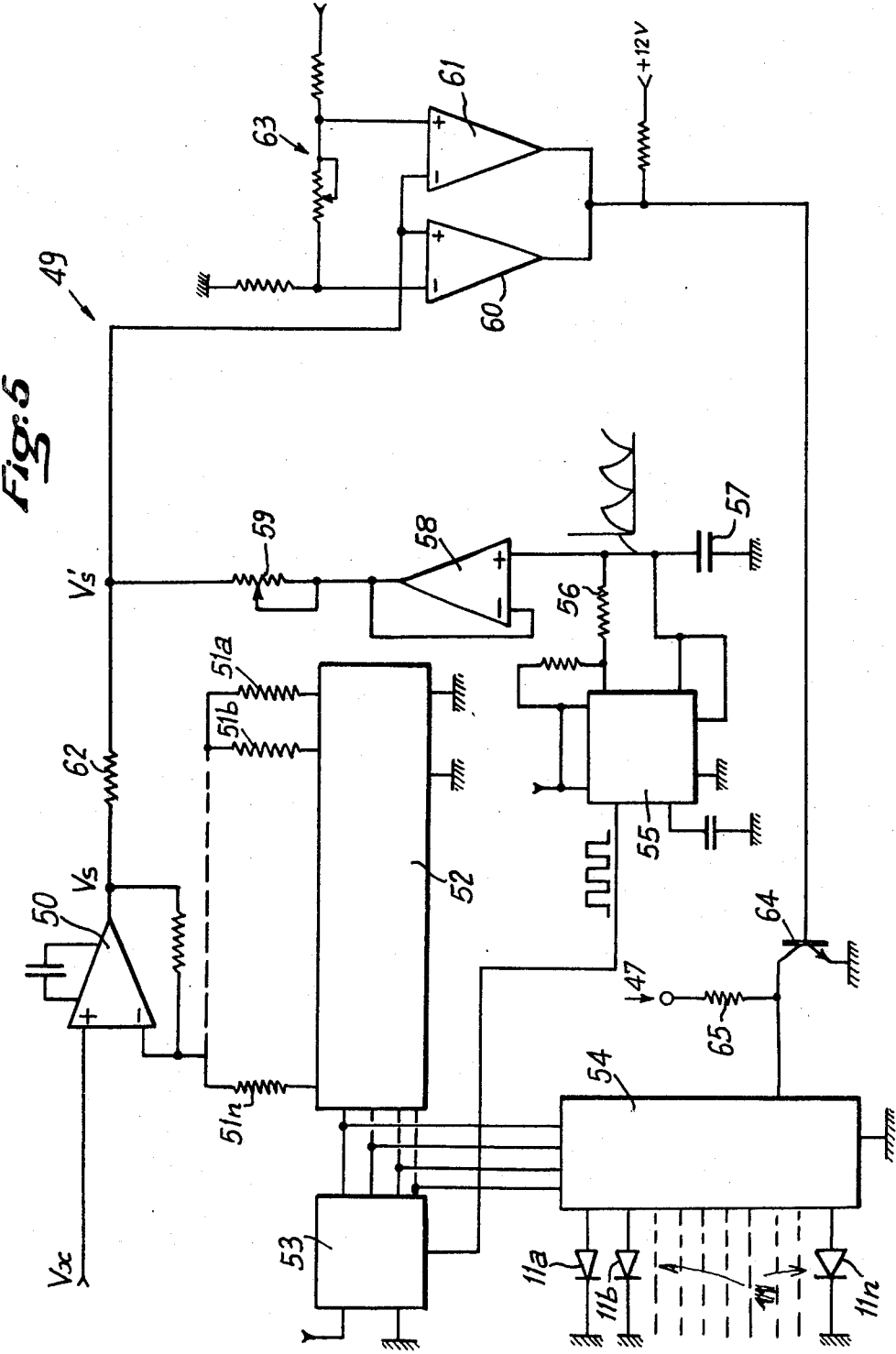
FIG. 5 is the electrical diagram of a device for the selective drive of the light emitting diodes in the display device.

FIG. 5 is the diagram of one form of execution of the light emitting diodes (11) control circuit (49). These diodes can for example be 16 in number, corresponding respectively to different lens opening values, going from $-2$ (not included) to $+2$ (included) by $\frac{1}{4}$ stop fractions.

In circuit 49, signal $V_x$ corresponding to the measurement of the light, is applied to the + input of an operational amplifier (50) whose − input is connected to an assembly of resistors (51a, 51b, ... 51n) associated respectively to light emitting diodes 11a, 11b, ... 11n. These resistors are hooked up respectively to the n corresponding terminals of a multiplexer (52) whose inputs are connected to the corresponding outputs of a counter (53). When the device contains 16 diodes, counter 53 presents four outputs which are also respectively linked to the four inputs of another multiplexer (54). The diodes 11a ... 11n are connected in parallel to the corresponding outputs of the multiplexer 54. The counting input of counter 53 is linked to the output of an oscillator (55) delivering periodic rectangular signals.

Oscillator 55 is comprised of an astable multivibrator which, through the intermediary of an RC circuit (56, 57), produces a saw tooth signal applied to one input of operational amplifier 58. This amplifier's output is linked through potentiometer 59, to the respective + and − inputs of the two comparator amplifiers 60 and 61. The operational amplifier (50) output, showing a voltage signal of $V_s$, is also linked, through resistor 62, to these same inputs. The respective − and + inputs of the two comparator amplifiers 60 and 61 are respectively linked to points of a voltage divider (63) where reference voltages $V_A$ and $V_B$ are present, defining a range. The outputs of comparator amplifiers 60 and 61 are linked together to the base of an inverter transistor (64) whose emitter is grounded, and whose collector is linked both to the multiplexer (54) input, and through resistor 65 to a terminal to which the output signal from the display device (9) amplifier (47) is applied.

The functioning of circuit 49 driving the voltage into the light emitting diodes is the following: as was shown above, during the photometric measurement, only one of diodes 11a ... 11n is unlit in the succession of diodes side by side, while the other diodes are lit. The position of the unlit diode in the series of other lit diodes indicates the deviation between the value of the light flow effectively measured and that of the flow which would normally expose the film, taking the film sensitivity into account, in optimal conditions. In other words, the unlit diode indicates the deviation in f stops or fractions thereof, above and below, between the lens opening value effectively used, and the one which should be used to obtain correct exposures.

It will be supposed that voltage $V_x$ corresponding to the measurement of the quantity of light falling upon the film at each shutter revolution, will have a value of 2 volts, for example, that is if the f stop setting is the right one. In practice, voltage $V_x$ can vary either above or below this balance value of 2 volts; the variation value increases exponentially as the lens is opened up. For example, for one f stop more, voltage $V_x$ is equal to 4 volts, for 2 stops it is 8 volts, etc....

In control circuit 49, voltage $V_x$ is measured using amplifier 50, whose gain is adjusted so that the output voltage $V_s$ of this amplifier is as close as possible to 2 volts. To this end, two amplifiers 60 and 61 are used to compare the voltage $V_s$ (more specifically output voltage $V_{s'}$, coming out of amplifier 58, for reasons to be shown below) with two thresholds voltages $V_A$ and $V_B$ which comprise the optimal value of 2 volts, and define a range. This comparison is made cyclically, successively scanning both the series of resistors (51a ... 51n) with multiplexer 52 and the series of diodes (11a ... 11n) with multiplexer 54, using the output signals of counter 53 itself powered by oscillator 55. The scanning is carried out as follows: at the beginning of the cycle, counter 53 in zero position commands connection of multiplexer 52 to resistor 51a which sets the highest gain for the operational amplifier (50) and connection of multiplexer 54 to the first diode (11a) corresponding to the widest lens opening, that is maximum overexposure, for example with a lens opening of $+1\frac{3}{4}$. If the output voltage $V_s$ obtained with this gain is outside the range of voltages $V_A-V_B$, one of the amplifiers (61) is released, transistor 64 is locked, and the end diode (11a) corresponding to a lens opening of $+1\frac{3}{4}$ is then lit up. The brightness of this diode depends, as shown above, on the amplitude of the amplifier (47) output signal that is on the film sensitivity, in fact.

At the next step in the cycle, through multiplexer 52, counter 53 connects the following resistor (51b) whose value is higher than that of 51a, so that the gain of the operational amplifier is slightly reduced. If the new output voltage $V_s$, obtained with this new gain is again situated outside the $V_A-V_B$ range, the comparator amplifier (61) is released, causing the second diode (11b) in the series to light up, through multiplexer 54.

This process repeats itself until the output voltage $V_s$ is practically equal to the chosen 2 volt balance value. Then multiplexer 52 connects one of the resistors whose value gives a gain ensuring this output voltage of 2 volts. As this voltage is within the predetermined range of $V_A-V_B$, both amplifiers 60 and 61 are locked, transistor 64 conducts, and the multiplexer (54) input is grounded. Thus the diode which at this instant is connected by multiplexer 54 is not lit up, so that it appears darkened in the series of adjacent diodes. Then, as the scanning continues, multiplexer 52 successively connects resistors of increasing weights or values, so that at each step of the cycle, the gain of amplifier 50 decreases, and the output voltage $V_s$ is once again outside the range $V_A-V_B$, being below the lower thresholds voltage $V_A$. In this case, comparator amplifier 60 is released and the last diodes of the series, up to the extreme diode 11n are successively lit up.

The result of the above is the cyclic scanning of the n diodes 11a ... 11n, which are all successively lit up with the exception of one among them, which remains unlit indicating the variation compared to the balance. Given the persistence of the retinal image, the observer thus sees in the viewfinder a row of illuminated diodes, excepting one which indicates the necessary f stop correction. In fact, as has been shown above, the voltage compared to range $V_A-V_B$ is voltage Vs, resulting from modulation of the output voltage Vs by the saw tooth signal delivered by oscillator 55 and amplified by amplifier 58. Voltage Vs, which is applied to the inputs of comparator amplifiers 60 and 61, has therefore a triangular periodic form whose level follows the steps of output voltage Vs. Thus during scanning when a voltage near 2 volts corresponding to the balance is obtained, two adjacent diodes are partially darkened instead of a single diode totally darkened during the scanning time.

In other words, one diode can be darkened during 80% of the corresponding step, for example, while the next diode is darkened during 20% of the following step. In this way the operator sees 2 adjacent diodes one of which is darker than the other, all the other diodes being totally illuminated.

The advantages of the circuits described above compared to all logarithmic conversion systems known is that the logarithmic conversion is carried out in networks which are not temperature sensitive; such is not the case for devices known today for analogic logarithmic conversion.

Finally, as has been shown above, the variable cyclic ratio signal $\alpha$, emitted by control device 19, can also be used to vary the light intensity of light emitting diodes 66a, 66b, ... 66n of marking device 22 in function of the film sensitivity. In particular, the more sensitive the film is, the lower the intensity of the voltage going through these diodes must be. To this end, the periodic signal of the cyclic ratio $\alpha$ is applied to one input of inverter amplifier 67 whose output is linked through resistor 68 to the base of a modulator transistor 69 connected in parallel to the emitters of transistors 70a, 70b, ... 70n whose collectors are linked to the cathodes of the respective diodes (66a, 66b, ... 66n) and whose bases receive respectively signals a, b ... n corresponding to the bits to be marked on the film. Thus, when one or several transistors (70a, 70b, ... 70n) are made conductors through the presence of the appropriate control signals, the light emitting diode or diodes are powered by currents chopped at the lock release cadence of modulator transistor 69 whose average value consequently depends on the inverse of the cyclic ratio $\alpha$. In other words, the higher the cyclic ratio $\alpha$ (the higher the film sensitivity), the lower the current going through the light emitting diodes 66a, 66b, ... 66n.

The intensity of the light flow emitted by these diodes varies in inverse function of the film sensitivity.

Through a variant execution of the present invention, display device 9 can be replaced by a microprocessor whose outputs power light emitting display diodes (11a ... 11n). This microprocessor can be of the following type: Intel 8748 or 8022.

In the electrical circuit of FIG. 4, if the potentiometer 24 is linear the cyclic ratio $\alpha = \tau/T$ varies linearly and if it is logarithmic, this cyclic ratio qallows to obtain linear graduations directly function of the film sensitivity.

By slightly shifting the high voltage switching threshold of the Schmitt trigger 23 with respect to the low voltage threshold, one can adjust the variation low and conform the theoretical curve to the curve given by the potentiometer, if the gap is not too high. This adjustment may be made through an auxiliary potentiometer 30 connected between the supply voltage Va and the ground, the sliding contact of which is linked to the Schmitt trigger 23.

What is claimed is:

1. A film exposing equipment, such as a motion picture camera or still camera, containing a display device which, with the movement of a mark over a scale, indicates the variations of a measured parameter, said display device having a succession of light emitting diodes side by side, determining the measurement scale, said diodes being powered and consequently luminous at all times, with the exception of one single darkened diode constituting the result of the measurement; said film exposing equipment being associated with a photometric measuring device comprising means for adjusting the brightness of the light emitting diodes of the display device in inverse function of the sensitivity of the film used, and for adjusting accordingly the gain of the photometric measuring device in direct function of film sensitivity.

2. A film exposing equipment according to claim 1 comprising at predetermined intervals, in the succession of light emitting diodes, specific diodes different from the other diodes by their dimensions and/or colours, and constituting particular fixed marks on the measurement scale.

3. A film exposing equipment according to claim 1, applied to a reflex motion picture camera provided with a viewing screen and an optical viewing system, comprising a convex mirror placed between said viewing screen and said optical viewing system so as to form, in the real image plane of the viewing screen, a reduced image of the light emitting diodes constituting the display device.

4. A film exposing equipment according to claim 3 comprising a photosensitive device and a beam splitter placed between the viewing screen and the optical viewing system to direct a portion of the light rays going to the operator's eye towards said photosensitive device, said beam splitter having a mobile shutter which can be inserted or withdrawn from the light path towards the eye.

5. A film exposing equipment according to claim 1, wherein said adjusting means include a control device emitting a periodic signal the cyclic ratio of which is adjustable in function of the film sensitivity, and in the display and photometric measuring device, means for demodulating the signal and for controlling in an inverse proportion the current intensity in the light emitting diodes of the display device, and proportionally the sensitivity of the photometric measurement system.

6. A film exposing equipment according to claim 5, wherein the control device emitting the adjustable cyclic ratio periodic signal contains a Schmitt trigger switching alternatively between an upper and a lower threshold, and whose control input is linked to the common point between a capacitor and the sliding contact of a potentiometer, together constituting an RC circuit, said capacitor being periodically charged and discharged, its discharge time, determined by a first portion of the resistance of said potentiometer, corresponding to a duration of the periodic signal, while its charging time, determined by the other portion of the resistance of said potentiometer, corresponds to the duration of interval $T-\tau$ between two successive signals, and a second potentiometer for possible use to slightly displace one of the switch thresholds of the Schmitt trigger in relationship to the other.

7. A film exposing equipment according to claim 6 wherein the photometric measuring device contains a chopper circuit to which the adjustable cyclic ratio periodic signal is applied, this chopper circuit being connected to the output of an amplifier amplifying the photometric signal emitted by a photoelectric cell, an integrating device linked to the chopper output, and an amplifier connected between the integrating circuit and the base of a first transistor where collector is linked to an integration capacitor, voltage $V_x$ on the terminals of this capacitor representing the quantity of light received by the film at each shutter revolution, this voltage $V_x$ being brought back to zero at each revolution as a result of the discharge of the integrator through a transistor receiving at its base a control signal at each shutter revolution.

8. A film exposing equipment according to claim 7, wherein the display device contains an inverter amplifier whose input is linked to the output of the control device emitting a variable cyclic ratio periodic signal, and whose output is linked to an integrating device itself connected through an amplifier to a circuit controlling the successive and cyclic power supply into the light emitting diodes.

9. A film exposing equipment according to claim 8 wherein the circuit controlling the successive and cyclic power into the light emitting diodes of the display has an oscillator emitting a first train of periodic signals applied to the input of a counter whose stage outputs are linked to first and second multiplexers, said oscillator emitting, through an RC circuit, a saw tooth signal applied to one input of a first operational amplifier, the outputs of the first multiplexer being respectively and separately connected to first resistors of increasing values or weights, linked together to the input of a second operational amplifier receiving on its second input a signal $V_x$ representing the quantity of light received by the film, the outputs of the first and second operational amplifiers being linked to each other through second and third resistors, to the positive and negative inputs respectively of two comparator amplifiers, to the other respective negative and positive inputs of which are applied the low and high threshold voltages defined by a voltage divider, the outputs of the two comparator amplifiers being connected to each other at the base of an inverter transistor whose collector is linked, through a fourth resistor, to the output of amplifier of the display device delivering voltage in inverse function to the value of the cyclic ratio of the periodic signal emitted by the control device, this collector also being connected to the input of the second multiplexer whose individual outputs are connected separately and respectively to light emitting diodes of the display device such that the diodes are scanned cyclically, and are all lit up with the exception of the one for which the resistor among the set of first resistors connected to the outputs of the first multiplexer has a value such that the value of the voltage applied to the positive and negative inputs of the comparator amplifiers be within the range defined by the two threshold voltages.

10. A film exposing equipment according to claim 5, with a device for marking figures on the film with light emitting diodes, wherein said marking device is linked to the output of the control device emitting the periodic signal whose cyclic ratio is adjustable in function of the film sensitivity, and has an inverter amplifier receiving this signal on its input, and having its output connected to the base of a modulator transistor whose collector is linked to the emitters of transistors whose collectors are linked to light emitting diodes, and whose bases receive respectively the signals corresponding to the bits to be marked on the film.

* * * * *